Feb. 5, 1929.
F. H. PIKE
1,700,746
ROD OR STEM PACKING
Filed Nov. 5, 1926
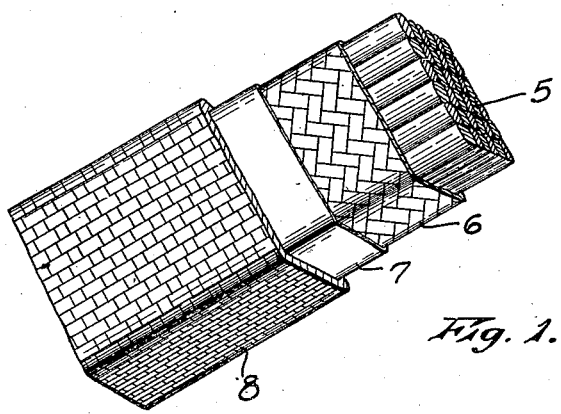
Fig. 1.
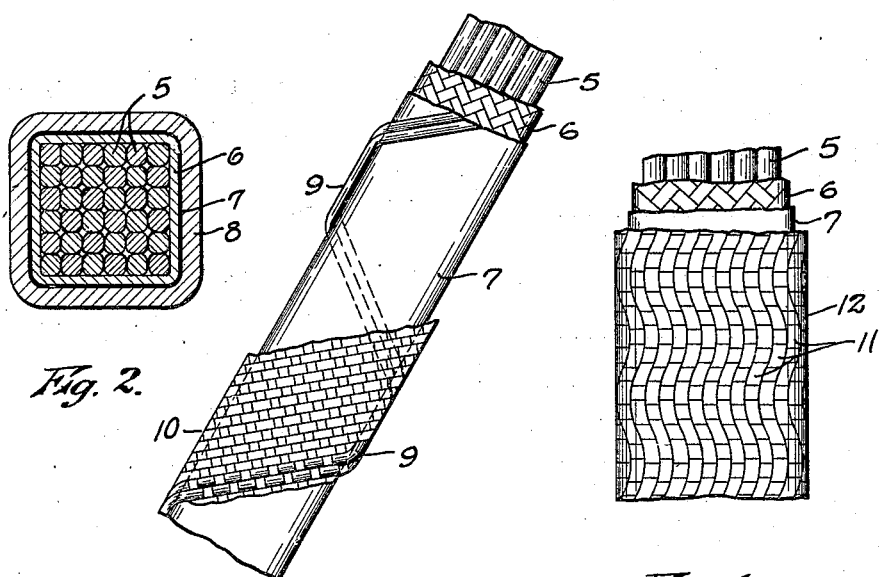
Fig. 2.
Fig. 3.
Fig. 4.
Inventor
Frederick H. Pike
By Wooster & Davis
Attorneys Patented Feb. 5, 1929.

1,700,746

UNITED STATES PATENT OFFICE.

FREDERICK H. PIKE, OF CHARLESTON, SOUTH CAROLINA, ASSIGNOR, BY MESNE ASSIGNMENTS, TO THE GENERAL ASBESTOS AND RUBBER COMPANY, OF CHARLESTON, SOUTH CAROLINA, A CORPORATION OF SOUTH CAROLINA.

ROD OR STEM PACKING.

Application filed November 5, 1926. Serial No. 146,379.

This invention relates to a packing which is used for packing reciprocating and rotating rods, such as piston or pump rods for packing against steam and other active agents, and has for an object to form an improved packing which will be more flexible than the packing now generally constructed so that it may be wrapped about rods of relatively small diameter without breaking or injuring the packing and still will retain its shape in use.

It is also an object of the invention to provide a packing of this type which will have the property of expanding in one direction by compression in a direction at right angles to this first direction.

It is another object of the invention to provide a packing in which a lubricant of various elements for the packing is sealed within the packing, and therefore, the desired flexibility or yielding properly will be maintained indefinitely without the packing becoming hard.

With the foregoing and other objects in view, I have devised the new construction of packing, some of the preferred forms of which are illustrated in the accompanying drawing forming a part of this specification. In this drawing, Fig. 1 is a perspective view of a piece of packing constructed according to my invention but with portions of the jackets or casings broken away to more clearly show the construction.

Fig. 2 is a transverse section thereof.

Fig. 3 is a view similar to Fig. 1 showing a slightly different way of arranging the yarns for the outer casing, and Fig. 4 is a side elevation showing a still different way of arranging the yarns for this casing.

This packing is preferably made of asbestos, although certain other substances may be incorporated if desired to increase the strength thereof, as for instance, some cotton or linen, thread or fibres may be twisted or incorporated in the yarns, especially those used in the jackets or casings, so that these yarns could stand more strain or pull in weaving. The construction shown in Fig. 1 comprises a core composed of a plurality of longitudinally extending yarns preferably of asbestos yarn, and they are also preferably arranged in parallel relation. Tightly enclosing this core is a casing or a jacket 6 which is composed of yarn, preferably of asbestos, braided about the yarns of the core. This inner casing or jacket is then covered with a fresh coating of rubber compound or cement 7 and an outer casing or jacket 8 is then woven over this cement and the inner casing. It is preferred that this outer jacket be woven in position on the inner jacket or casing and thus form a seamless woven casing. The parallel arrangement of the yarns 5 gives the packing the property of expanding in one direction by compression in a direction at right angles to this direction, so that when tightened or compressed by the gland or follower in the stuffing box the packing will expand radially against the walls of the rod or cylinder making the tight joint desired. The yarns of the core are also lubricated with a suitable lubricant and graphite, so that they are easily movable one upon or relative to each other. The coating 7 of the rubber compound seals the inner casing and core and retains the lubricant therein, and therefore, retains the flexibility of the packing indefinitely. This coating also cements the two casings or jackets together, and therefore, helps to keep them in proper relative positions. Asbestos is peculiar in that it tends to pack under pressure rather than flow so that by using the parallel or longitudinally extending unwoven lubricated yarns in the center I secure the flow or yielding required in this type of packing, and I am enabled to use asbestos with its desirable properties of fire and heat resistance and also resistance to chemical action, and with the seal for the lubricant can maintain this flexibility indefinitely without the packing becoming hard. The combination of the braided and woven jackets or casing with this arrangement of the core gives the desired flexibility while giving sufficient resistance to change to maintain the proper shape. The braided casing is flexible and may stretch longitudinally giving a very flexible center while the woven outer jacket does not stretch to any great extent and keeps the packing to shape and properly confines the center construction.

In Figs. 3 and 4 I have shown slightly different arrangements or methods of weaving the outer casing or jacket. It will be apparent that where the packing is used on rods of relatively small diameter, in wrapping the packing about the rod the outer surface must be longer than the inner surface due to the difference in the length of the inner and outer radii, and therefore, if the warp threads of the jacket extend parallel with the axis of the packing an undesirable strain may be placed on the warps in the outer surface. I may, therefore, as shown in Fig. 3, arrange the warps 9 of the outer jacket or casing 10 spirally about the inner jacket so that when the packing is wrapped about the rod the warps in the outer surface of the packing may straighten somewhat and become more nearly parallel with the axis of the packing and will not be placed under undue strain.

A similar effect may be secured as shown in Fig. 4, by arranging the warps 11 of the outer jacket or casing 12 in a zigzag relation which will allow them to straighten out as the packing is wrapped about the rod and thus prevent any undue strain on these warps. It will be apparent that this arrangement also makes the packing somewhat more flexible.

It will be apparent from the foregoing description that this construction of packing may be composed of asbestos, and that in spite of the tendency of asbestos to pack under pressure the packing will flow under the pressure of tightening the stuffing box to give the proper seal. As the lubricant for the yarns is sealed within the packing this flexibility will be maintained indefinitely and without the packing becoming hard.

Having thus set forth the nature of my invention, what I claim is:

1. As a new article of manufacture a flexible packing comprising a core consisting of a plurality of longitudinally extending unwoven fibre yarns, a flexible fibre casing of braided yarns enclosing said first yarns, and an outer woven fabric casing enclosing the first casing.

2. As a new article of manufacture a flexible packing comprising a core consisting of a plurality of longitudinally extending unwoven yarns, a flexible fibre jacket braided about said yarns, and a second fibre jacket woven in position about the first jacket.

3. As a new article of manufacture a flexible packing comprising a core composed of a plurality of parallel fibre yarns, a casing of braided fibre yarns enclosing the first yarns, a lubricant within the casing for the first yarns, a coating of a cement about the braided casing and acting to seal the lubricant in the core, and an outer woven casing about said coating.

4. As a new article of manufacture a flexible packing comprising a core composed of a plurality of longitudinally extending, unwoven fibre yarns including asbestos, a braided fibre casing including asbestos enclosing said yarns, and an outer seamless woven fibre casing including asbestos enclosing the first casing.

5. As a new article of manufacture a flexible packing comprising a core composed of a plurality of longitudinally extending unwoven asbestos fibre yarns, a lubricant for said yarns, a braided asbestos fibre casing enclosing said yarns, a seamless woven asbestos fibre casing enclosing the first casing, and a coating of a cementing compound between the two casings and forming a seal to retain the lubricant in the core.

6. As a new article of manufacture a flexible packing comprising a flexible core composed of a plurality of elements, and a woven fibre casing enclosing said elements, the warp yarns of the casing being inclined to the axis of the packing so that when the packing is bent about a curved member the warped strands in the outer portion of the casing may elongate without stretching.

7. As a new article of manufacture a flexible packing including a core composed of a plurality of longitudinally extending yarns, a braided fibre casing enclosing said yarns, and a woven fibre casing enclosing the first casing, the warp of said outer casing being inclined to the axis of the packing so that when the packing is bent about a curved member the strands of the warp at the outer portion of the packing may elongate without stretching.

In testimony whereof I affix my signature.

FREDERICK H. PIKE.